Sept. 10, 1963  L. J. KOHLI  3,103,116
BRAKE MECHANISM FOR A SHOCK TESTING MACHINE
Filed Oct. 3, 1960  2 Sheets-Sheet 1

LEMLEY J. KOHLI
INVENTOR.

BY
ATTORNEYS

Sept. 10, 1963     L. J. KOHLI     3,103,116
BRAKE MECHANISM FOR A SHOCK TESTING MACHINE
Filed Oct. 3, 1960     2 Sheets-Sheet 2
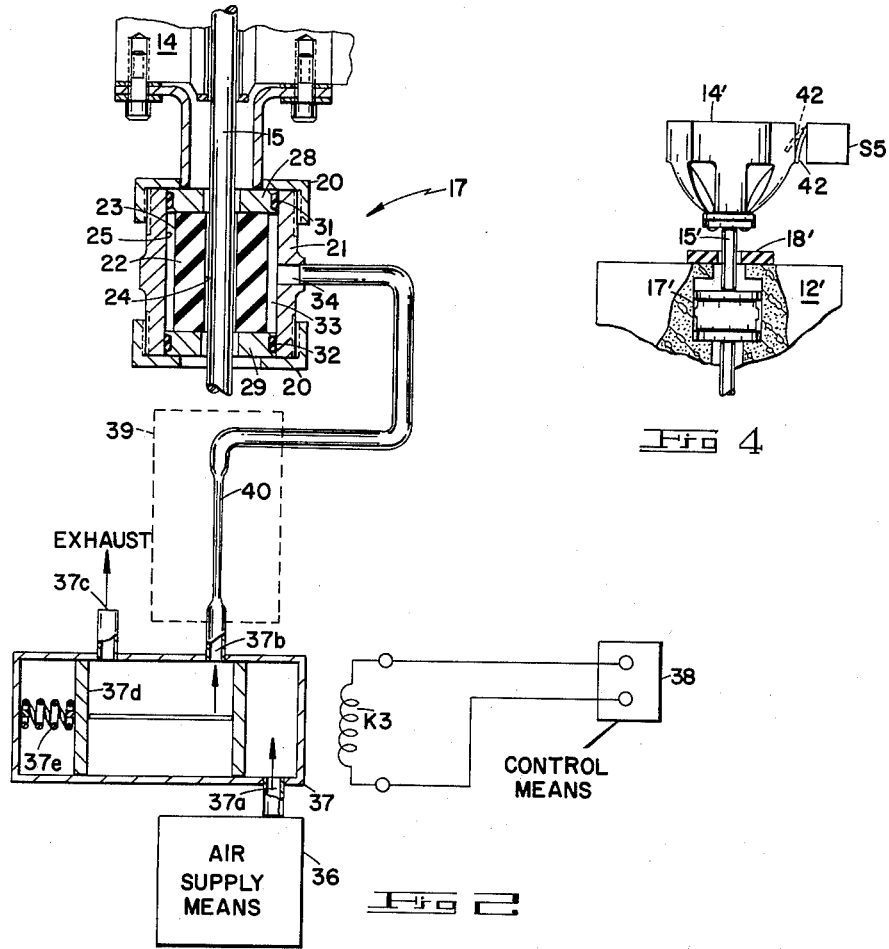
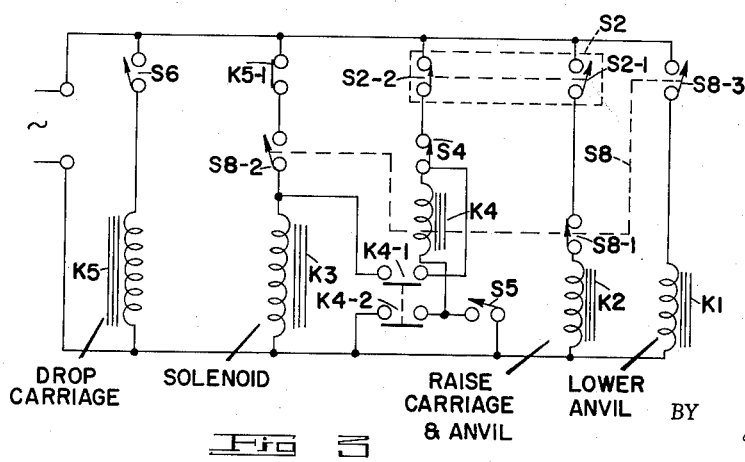
LEMLEY J. KOHLI
INVENTOR.
BY
ATTORNEYS

United States Patent Office 3,103,116
Patented Sept. 10, 1963

3,103,116
BRAKE MECHANISM FOR A SHOCK
TESTING MACHINE
Lemley J. Kohli, Andover, Mass., assignor to Avco Corporation, Cincinnati, Ohio, a corporation of Delaware
Filed Oct. 3, 1960, Ser. No. 60,184
6 Claims. (Cl. 73—12)

This invention relates generally to brake mechanisms for shock testing machines, and more particularly to a fluid brake mechanism.

By way of illustration and not limitation, the present invention will be presented in conjunction with the shock testing machine described in the application of Gerald A. Jensen et al., Serial No. 739,261, filed June 2, 1958, now Patent 2,955,456.

The shock testing machine described in the above identified application is a "free fall" machine. That is to say, a desired shock pulse is produced by impacting a free falling carriage, carrying a test specimen, against an immovable anvil. The shape of the shock pulse produced is determined by a shock absorbing device seated on the anvil. In the Jensen et al. machine a saw-toothed pulse is generated through the use of a solid lead pellet. A half sine wave pulse can be produced through the use of a resilient rubber pad, while a square wave can be generated using a short length of lead tubing.

One of the problems confronting persons skilled in the use of the shock testing machine is the tendency for the movable member (carriage) to rebound one or more times after the initial impact and thus produce multiple shock pulses, of decreasing magnitude.

Rebounding is a problem irrespective of the type of shock pulse desired or the type of shock absorbing device used. It is a particularly serious problem where a half sine wave shock pulse is sought, since the most satisfactory shock absorbing device used for this type of pulse is a resilient rubber pad or disc. The rubber pad does not absorb all of the energy contained in the falling carriage, and, as a consequence, the carriage readily rebounds several times before coming to rest.

There is also a growing tendency today toward designing shock testing machines with a capacity to test enormous specimens. For example, today, a "large" machine has a specimen capacity on the order of one-half ton, with a carriage weighing two and one-half tons. Designers are now considering building shock testing machines having a three-ton specimen capacity with a carriage weighing approximately ten tons. As will be seen, the carriage release mechanism for these extremely large machines poses special problems for prior art release mechanisms.

Applicant's novel brake mechanism takes into consideration both the rebounding problem and the carriage release problem, whereas, prior art anti-rebound mechanisms are single function items. The prior art devices are also quite complex and not adaptable for use, as an accessory on existing machines.

It is an object of the invention to provide a brake mechanism for a shock testing machine which avoids the limitations and disadvantages of prior art mechanisms of this nature.

It is another object of the invention to provide a brake mechanism for a shock testing machine which operates efficiently, reliably and quickly.

It is yet another object of the invention to provide a multifunction brake device for shock testing machines.

It is still another object of the invention to provide a brake mechanism for a shock testing machine which sequentially maintains a movable member in a predetermined position, releases the movable member so that it may be impacted against an immovable member, and prevents multiple rebounding of the movable member against the immovable member.

It is still another object of the invention to provide a brake mechanism which includes a control circuit that is actuated prior to impact but becomes fully operative after impact for preventing multiple rebounding.

It is still another object of the invention to provide a pneumatic brake mechanism which is efficient, reliable and may be incorporated on most existing shock testing machines.

In accordance with the invention, a shock testing machine comprises in combination an anvil, a carriage adapted to be raised above the anvil and impacted thereon and brake means attached to the carriage. The brake means, which includes a control circuit, functions to:

(1) Maintain a movable member in a predetermined position;
(2) To release the movable member so that it may be impacted against an immovable member; and
(3) Acts to prevent multiple rebounding of the movable member against the immovable member.

The brake means comprises a pneumatic brake which is actuated by the control circuit to permit and prevent relative movement between the carriage and the anvil. The brake mechanism also includes delay means for inhibiting the flow of air to the brake so that it does not become fully engaged when actuated.

The novel features that are considered characteristic of the invention are set forth in the appended claims; the invention itself, however, both as to its organization and method of operation, together with additional objects and advantages thereof, will be best understood from the following description of a specific embodiment when read in conjunction with the accompanying drawings, in which:

FIGURE 2 is a block diagram of the control system in conjunction with a pneumatic brake:

FIGURE 3 is a circuit diagram of an illustrative control circuit; and

FIGURE 4 is a view of another carriage and brake construction comprising another embodiment of the invention.

Figure 1:
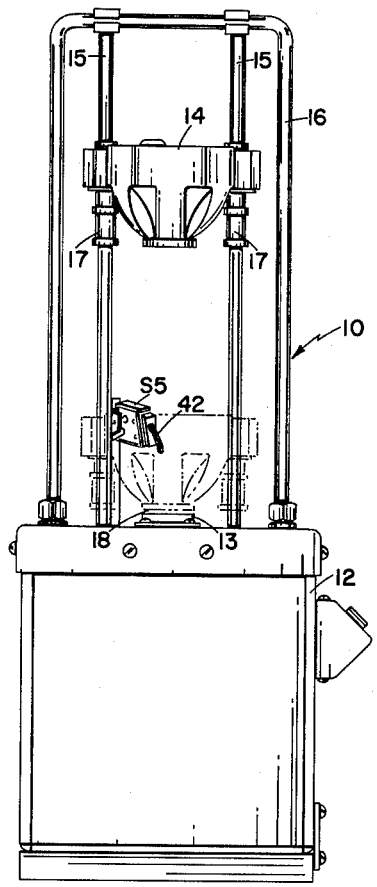
FIGURE 1 is a side elevation view of a shock testing machine embodying the principles of the present invention.

*Description of the Shock Testing Machine and Brake Mechanism*

Referring to FIGURE 1 of the drawings, there is represented a shock testing machine 10 embodying a brake mechanism embodying the principles of the present invention. The shock testing machine includes a base 12 having an anvil 13, a carriage 14, and a supporting framework 16 to support the carriage 14, as well as rods 15 to guide the fall of the carriage 14. The carriage 14 is aligned vertically over the anvil 13 and is constrained to drop vertically by gravity to the anvil 13 by means of a pair of brakes 17 in a manner to be described hereinafter. Carriage 14 is guided in its fall by the vertically extending rods 15. A switch S5 including an actuating lever 42 is secured to the base and spaced from the top thereof by some predetermined distance.

A rubber pad 18 is centrally positioned on the anvil 13 to generate a half sine wave pulse. When the carriage 14 impacts on the pad 18, its deceleration is controlled by the pad and typically follows a half sine wave function.

Referring to FIGURE 2 of the drawings, it is seen that a brake 17 comprises a cylindrical outer wall 21 terminated in threaded ends which are capped by a pair of complementary threaded caps 20. The upper cap 20 is secured to the carriage 14. The brake cylinder also includes an inner rubber sleeve 22, the outer surface 23 of which is spaced from the outer wall 21. An internal wall 24 defines a central passage within the rubber sleeve 22.

The upper and lower ends of the rubber sleeve 22 are secured to short, metal sleeves 28 and 29 respectively, as by cementing or in any other suitable manner. The metal sleeves 28 and 29 are spaced from the inner wall of the outer cylinder 21 by a pair of O rings 31 and 32. As seen in FIGURE 2, a vertical rod 15 passes through the rubber cylinder 22, sleeves 28 and 29, and caps 20.

As can be seen in FIGURE 2, a chamber 33 is defined by an outer surface 23 of the sleeve 22, the O rings 31 and 32 and the inner surface 25 of the outer wall cylinder 21. An access passage 34 to chamber 33 passes through the walls of the outer wall 21.

Also depicted in FIGURE 2 is a block representation of the control system for the brake 17. In general, the brake 17 can operate with either a liquid or gas, however, it responds most efficiently when used as a pneumatic device. Accordingly, there is provided an air supply means 36 which may comprise a conventional compressed air facility. The air supply means 36 is in fluid communication with a solenoid valve 37, which in turn is, preferably, controlled electrically through solenoid coil K3 by a control means 38. The solenoid valve 37, also of a conventional nature, comprises an inlet 37a coupled to air supply means 36, an outlet 37b coupled to a delay means 39 and an exhaust outlet 37c opening into the atmosphere. A slidable plunger 37d which is actuated by solenoid coil K3, is shown in its normally de-energized position connecting outlet 37b to the atmosphere. When solenoid coil K3 is energized plunger 37d is moved to the right coupling outlet 37b to inlet 37a. The outlet 37b is coupled to the brake 17 through a delay means 39, which preferably comprises a length of tubing 40 having a constricted cross section.

*Operation of Shock Testing Machine With a Pneumatic Brake Mechanism*

As seen in FIGURE 2, the rubber sleeve 22 in a brake 17 surrounds a vertical rod 15. When air under pressure enters the chamber 33, it will deflect the rubber sleeve 22 towards the rod 15. The length of the rubber sleeve, the air pressure applied, and the coefficient of friction between the guide rod and rubber sleeve determine the frictional force developed. Since only the air pressure will vary to any great extent, the brake 17 fully engages the rod 15 at or above a specific air pressure. When fully engaged, the brake 17 prevents relative movement between the carriage 14 and the rods 15.

As mentioned heretofore, the novel brake mechanism has three principal functions in the machine under consideration:

(1) To hold the carriage 14 in an elevated position;
(2) To release the carriage so that it may fall to the anvil; and
(3) To prevent multiple rebounding of the carriage 14.

The operation of the brake mechanism in performing these functions can best be illustrated by going through a typical test drop. Initially, it may be assumed that the carriage is at rest on the anvil. In a manner described in the aforementioned Jensen et al. application, the carriage is raised pneumatically by the anvil to a predetermined position. At this time, the control means 38, in a manner to be described hereinafter, energizes solenoid coil K3 and activates solenoid valve 37. Plunger 37d moves to the right and air from the air supply means 36 is applied to the delay means 39, and finally to the chamber 33. With the introduction of air to chamber 33 the rubber sleeve 22 deflects and eventually creates a sufficient frictional force between it and the vertical rod 15 to hold the carriage 14 in the elevated position.

To drop carriage 14, the control means 38 is again actuated, this time to de-energize solenoid coil K3. Plunger 37d moves, under the influence of spring 37c, to the left, to the position shown in FIGURE 2. The air in chamber 33 is exposed to the atmosphere. The pressure against the sleeve 22 drops; the frictional force disappears, and the carriage 14 falls toward the anvil 13.

Prior to impact the carriage 14 engages lever 42 (FIGURES 1 and 4) and actuates switch S5. Switch S5 in conjunction with the control means 38 again energizes the solenoid valve 37 and introduces air, through delay means 39, to the chamber 33.

It is obvious that if the air is introduced at full pressure at this time, before impact, it will interfere with the impact providing an undesirable, unpredictable shock pulse. To prevent this from happening, the delay means 39 is placed in the air line to provide a gradual build up of air pressure in chamber 33. Thus, the carriage 14 is permitted to impact against the anvil 13 and rebound therefrom.

The delay means 39 is calibrated so that full pressure is applied to brake 17 just after the carriage rebounds for the first time. It is also to be noted that the position of S5 prior to releasing the carriage 14 must be considered in determining the length of delay to be built into the delay means 39.

It will be readily recognized that the delay means 39 may comprise any of the well-known electronic or electromechanic delay devices which can operate in conjunction with the solenoid valve 37. However, a proven, reliable, and highly efficient delay means for delaying the build up of air in the brake 17 is a section of conduit 40, the cross sectional area of which is smaller than the cross sectional area of the remaining conduit. This is shown schematically in FIGURE 2. By judiciously choosing a suitably restricted cross section and length, an accurate delay in the full engagement of the brake 17 can be achieved.

In FIGURE 4 of the drawings there is illustrated another form of shock machine construction, including a pneumatic brake. The FIGURE 4 construction features a guide rod 15′ which guides the movement of a carriage 14′ or movable member. Guide rod 15′ is secured to the carriage 14′. A brake 17′ is secured to the base 12′ of the shock testing machine and controls the relative movement between the carriage 14′ and the rod 15′ with respect to the base 12′ and shock absorbing device 18′ of the shock testing machine in the manner previously described.

Also illustrated in FIGURE 4 is the carriage 14′ actuating switch S5. It is seen that the carriage moves past a lever 42 and in so doing depresses the lever 42 laterally, from the dotted position shown, actuating switch S5.

*Description and Operation of an Illustrative Control Circuit*

An illustrative control circuit for controlling the sequence of events discussed above is set forth in FIGURE 3 of the drawings. The FIGURE 1 machine will be used in this illustration. Manually or mechanically activated switches are designated by the symbol S, followed by an identifying number; relay coils and contacts and solenoid coils carry a K designation. The switches and relays are shown in their normally de-energized position which corresponds to the carriage resting on the anvil.

To raise the carriage, switch S2 is actuated, closing switch contact S2–1 and opening switch contact S2–2. Electric power flows through contact S2–1, switch contact S8–1, to relay coil K2. Relay K2, when energized, will in turn activate a prime mover, such as a pneumatic motor (not shown) which raises the anvil and the carriage to a predetermined height. At this point switch S8, comprising switch contacts 8–1, 8–2 and 8–3, is actuated, in the way switch 103 in the Jensen et al. application is actuated, or manually. When switch S8 is actuated, switch contact S8–1 opens de-energizing relay K2 and inactivating the carriage raising mechanism. At the same time switch contact S8–3 energizes relay K1 activating a prime mover (not shown) for lowering the anvil which raised the carriage. The solenoid coil K3 is also energized at this time through relay contact K5–1 and switch contact S8–2, thus actuating the brake 17, which in turn holds the carriage in the raised, predetermined position.

To drop the carriage, switch contact S-6 is closed, energizing relay K5. When relay K5 is energized, relay contact K5-1 is open, and the aforementioned energizing circuit for solenoid coil K3 is broken. The solenoid 37 is deactivated and opens the air chamber 33 in the brake 17 to the atmosphere in the manner described heretofore. With the loss of pressure in the brake 17, the carriage drops to the anvil. Before impact, however, the carriage 14 actuates switch S5, which causes the relay K4 to be energized through switch contacts S2-2 and S4. An energizing path for solenoid coil K3 is created through switch contact S2-2, switch S4 and relay contact K4-1. Solenoid valve 37 is again actuated and air from the supply means 36 passes through the solenoid valve 37 to the delay means 39. In the manner described heretofore, the delay means 39 delays the build-up of pressure in the brake 17 for a time sufficient to allow the carriage to impact against the anvil and rebound from it. After the rebound, the pressure in the brake 17 is sufficient to prevent further movement of the carriage.

A holding circuit for relay K4 is provided through switch contacts S2-2 and S4, and relay contact K4-2. Switch S4 is provided to open the holding circuit for relay K4 for releasing the brake 17.

Thus, the control circuit depicted in FIGURE 3 provides for the sequence of events which the novel shock machine brake mechanism is designed to accomplish, namely, (1) to maintain a carriage in a raised position, (2) release the carriage so that it may be impacted against an anvil, and (3) restrain the movement of the carriage after impact so that there will be no spurious shock pulses developed by repeated impacts or rebounding.

The supports holding a carriage in a raised position must be withdrawn simultaneously for the most satisfactory results. This is difficult to accomplish with the electromechanical devices, such as the hooks shown in the Jensen et al. application. Since it is reasonable to assume that the futuristic machines will need more than two supports, an already serious problem is aggravated if reliance on electromechanical devices is continued.

Unless there is a simultaneous withdrawal of the carriage supports, the carriage may be released in a skewed orientation. In its fall to the anvil, the carriage will oscillate in a manner similar to a feather floating down through the air. This lateral oscillation will induce in the carriage and the specimen carried by the carriage spurious signals which distort the test data and possibly introduce forces not intended to be introduced. The novel brake mechanism described heretofore provides a foolproof, simple and reliable means for releasing all the support points of a carriage simultaneously without the introduction of any sideways or lateral movement, since the pneumatic system is a constant pressure system. Thus, in extremely large shock testing machines, an equivalent of the novel brake construction is mandatory for supporting and releasing a carriage. The novel concept of using the same mechanism for rebounding provides extra dividends at relatively no extra cost.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In a shock testing machine having an immovable member, a movable member adapted to impact on said immovable member, guide means for guiding said movable member to said immovable member; a fluid brake secured to one of the aforementioned movable and immovable members and engageable with the guide means; fluid supply means, including a valve for supplying and exhausting fluid from said brake; control means including switch means actuated by said movable member prior to impact for coupling said fluid supply means to said brake; and delay means in the fluid path for limiting the flow of fluid to the brake, whereby full engagement of the brake is delayed until after impact.

2. A shock testing machine as described in claim 1 in which said delay means comprises a length of fluid conduit having a constricted cross section.

3. In a shock testing machine having an immovable member, a movable member adapted to impact on said immovable member, guide means for guiding said movable member to said immovable member; a fluid brake secured to one of the aforementioned movable and immovable members and engageable with the guide means; fluid supply means, including a valve and switch means, the latter for actuating the valve prior to impact for coupling said fluid supply means to said brake; and delay means in the fluid path for limiting the flow of fluid to the brake whereby full engagement of the brake is delayed until after impact.

4. In a shock testing machine having a base including an anvil, a carriage adapted to be raised above the base and dropped on the anvil, vertically extending rods passing through the base guiding the fall thereof; brake means comprising a brake secured to the carriage having an inner resilient sleeve and an outer sleeve separated by a closed chamber having an access hole through the outer sleeve, the guide means passing through the inner sleeve, valve means, fluid supply means, conduit means coupling said fluid supply and said valve means to the access hole, and delay means comprising a length of conduit having a constricted cross sectional area for limiting the flow of fluid from the fluid supply means to the brake.

5. In a shock testing machine having a base including an anvil, a carriage adapted to be raised above the base and dropped on the anvil, a vertically extending rod secured to the carriage and passing through the base for guiding the fall of the carriage; brake means comprising a brake secured to the base having an inner resilient sleeve and an outer sleeve separated by a closed chamber having an access hole through the outer sleeve, the guide means passing through the inner sleeve, valve means, a fluid supply means in fluid communication with said valve means, and a delay means in fluid communication with said valve means and the access hole for limiting the flow of fluid to said brake.

6. In a shock testing machine having an immovable member and a movable member adapted to move relative to said movable member for generating a shock pulse; a fluid brake secured to one of the aforementioned movable and immovable members and engageable with the other for preventing relative movement between said movable and immovable members; fluid supply means, including a valve for supplying and exhausting fluid from said brake; control means including switch means actuated by said movable member before said shock pulse is generated for coupling said fluid supply means to said brake; and delay means for fully engaging said brake after said shock pulse is generated.

References Cited in the file of this patent

UNITED STATES PATENTS

| | | |
|---|---|---|
| 2,177,876 | Perrey | Oct. 31, 1939 |
| 2,304,546 | Cox | Dec. 8, 1942 |
| 2,412,860 | Baudry et al. | Dec. 17, 1946 |
| 2,531,388 | Black | Nov. 28, 1950 |
| 2,811,192 | Kradoska | Oct. 29, 1957 |
| 2,955,456 | Jensen et al. | Oct. 11, 1960 |
| 2,967,590 | Ottestad | Jan. 10, 1961 |
| 3,064,464 | Black et al. | Nov. 20, 1962 |